(12) United States Patent
Lee et al.

(10) Patent No.: US 8,306,857 B2
(45) Date of Patent: Nov. 6, 2012

(54) DYNAMIC CONTENT SELECTION AND DELIVERY

(75) Inventors: Jason Lee, Forest Hills, NY (US); Andrew Glenn, New York, NY (US); Vince Li, Brooklyn, NY (US); Scott Spencer, New York, NY (US); Dritan Suljoti, New York, NY (US); Shing Franky Sze, Hoboken, NJ (US); Rigo Dillon, Berkeley, CA (US)

(73) Assignee: Google Inc., Mountain View, CA (US)

( * ) Notice: Subject to any disclaimer, the term of this patent is extended or adjusted under 35 U.S.C. 154(b) by 648 days.

(21) Appl. No.: 12/418,447

(22) Filed: Apr. 3, 2009

(65) Prior Publication Data
US 2009/0254437 A1 Oct. 8, 2009

Related U.S. Application Data

(60) Provisional application No. 61/042,576, filed on Apr. 4, 2008.

(51) Int. Cl.
*G06Q 30/00* (2006.01)
(52) U.S. Cl. .............................. 705/14.69; 707/E17.014
(58) Field of Classification Search ...................... 705/14
See application file for complete search history.

(56) References Cited

U.S. PATENT DOCUMENTS

| | | | |
|---|---|---|---|
| 6,285,987 B1 | 9/2001 | Roth et al. | |
| 6,324,519 B1 | 11/2001 | Eldering | |
| 7,072,853 B2 | 7/2006 | Shkedi | |
| 7,089,195 B2 | 8/2006 | Rosenberg | |
| 2007/0027772 A1* | 2/2007 | Chou | 705/14 |
| 2007/0067215 A1 | 3/2007 | Agarwal | |
| 2007/0192194 A1 | 8/2007 | O'Donnell | |
| 2007/0198350 A1 | 8/2007 | O'Kelley et al. | |
| 2007/0214045 A1* | 9/2007 | Subramanian et al. | 705/14 |
| 2008/0255977 A1* | 10/2008 | Altberg et al. | 705/35 |
| 2008/0262910 A1* | 10/2008 | Altberg et al. | 705/14 |
| 2009/0299799 A1* | 12/2009 | Racho et al. | 705/8 |

FOREIGN PATENT DOCUMENTS

KR 10-2006-0050566 5/2006

OTHER PUBLICATIONS

Story, Louise. 'DoubleClick to Set Up an Exchange for Buying and Selling Digital Ads', [online]. [retrieved on Nov. 1, 2007]. Retrieved from the Internet: http://www.nytimes.com/2007/04/04/business/media/04adco.html?_..., (2 total pages).
Written Opinion and International Search Report in application No. PCT/S2009/039523, dated Apr. 3, 2009, 10 pages.
Authorized office Beate Giffo-Schmitt, International Preliminary Report on Patentability in PCT/US2009/039523, mailed Oct. 14, 2010, 6 pages.

* cited by examiner

*Primary Examiner* — Alvin L Brown
(74) *Attorney, Agent, or Firm* — Fish & Richardson P.C.

(57) ABSTRACT

A system for selecting and delivering content items includes a primary system and a secondary system. Each system includes a server and a datastore of content items that is accessible by the server. The primary system receives a request for a content item, selects an appropriate content item from the primary datastore, and sends a query containing information regarding the selected content item to the secondary system. The secondary system receives the query, searches the secondary datastore, and determines whether to deliver the content item contained in the query, another content item, a default content item, or a pass-back to the requester.

37 Claims, 4 Drawing Sheets

DYNAMIC CONTENT SELECTION AND DELIVERY

RELATED APPLICATION

This application claims priority to U.S. Provisional Application No. 61/042,576, titled "Dynamic Advertising Selection and Delivery System" and filed Apr. 4, 2008, which is incorporated by reference.

TECHNICAL FIELD

This disclosure relates to content delivery over data-communications networks, such as the Internet.

BACKGROUND

Content publishers have space (e.g., on the publisher's web page) that they sell to advertisers or other content providers directly or through intermediaries, such as brokers. After fulfilling committed purchases, a publisher often has excess space inventory (called "remnant inventory") that the publisher attempts to sell through a remnant inventory marketplace. This remnant ad inventory market is a "spot" or "auction" type of market.

When a publisher participates in several networks for selling space, and one or more of those networks transact inventory with other networks, the process of matching a seller with a buyer may involve having a publisher sequentially pass available space to several networks one at a time, who in turn, sequentially pass that available space to their customers one at a time until a buyer is found. Thus, a request may pass through a long chain of offers/bids from multiple entities before being matched with a buyer. This daisy chain of interactions can slow down the process of selecting advertisements or other content for delivery to a consumer.

SUMMARY

In one general aspect, selecting and delivering content items, includes receiving a request for a content item from a requestor, selecting an eligible primary content item from a primary datastore, establishing a query that includes a threshold price, selecting an eligible secondary content item from a secondary datastore, comparing an effective payout associated with the selected secondary content item to the threshold price, and delivering one of the selected primary content item and the selected secondary content item to the requester based on the comparison of the effective payout associated with the selected secondary content item to the threshold price.

Implementations may include one or more of the following features. For example, the threshold price can equal an effective payout value of the selected primary content item. The query can include a creative associated with the selected primary content item, and delivering one of the selected primary content item and the selected secondary content item can include delivering the creative associated with the selected primary content item to the requester if the threshold price is greater than the effective payout associated with the selected secondary content item. The query can further include a net floor price, and the threshold price can be determined based on the net floor price. The primary datastore can be part of a primary system operated by a publisher of content associated with the request. The secondary datastore can be part of a secondary system operated by an intermediary. The secondary datastore can be part of a secondary system operated by an intermediary. The secondary system can include an content item exchange. The selected primary content item can be selected according to a highest effective payout value among eligible content items of the primary datastore. An effective payout value of the selected primary content item can include a net payment to a seller of a space for which the primary content item is selected. The selected secondary content item can be selected according to a highest effective payout value among eligible content items of the secondary datastore. At least one of the selected primary content item and the selected secondary content item can be an advertisement. An effective payout value of the selected secondary content item can include a net payment to a seller of a space for which a content item is selected. Selecting an eligible primary content item can include determining that no primary content item is eligible, and the threshold price be equal to a floor price included in the request. The primary datastore can be part of a primary system operated by a first intermediary, and the secondary datastore can be part of a secondary system operated by a second intermediary. The primary datastore can be part of a primary system, the secondary datastore can be part of a secondary system, and the primary system and the secondary system can include a common hardware component. A common datastore can include the primary datastore and the secondary datastore. The primary datastore can be a component of a primary system, the secondary datastore can be a component of a secondary system, and the primary system and the secondary system may not include a common hardware component.

In another general aspect, a selecting system for selecting and delivering content items includes a primary content item server and a primary datastore accessible by the primary content item server, where the primary datastore includes information regarding a plurality of primary content items. The selecting system also includes a secondary content item server and a secondary datastore accessible by the secondary content item server, where the secondary datastore includes information regarding a plurality of secondary content items The primary content item server stores instructions that are operable, when executed by the primary content item server, to receive a request for a content item from a requester, select an eligible primary content item from the primary database, and establish a query that contains a threshold price. The secondary content item server stores instructions that are operable, when executed by the secondary content item server, to select an eligible secondary content item from the secondary database, compare an effective payout associated with the selected secondary content item to the threshold price, and deliver one of the selected primary content item and the selected secondary content item to the requester based on the comparison of the effective payout associated with the selected secondary content item to the threshold price.

Implementations may include one or more of the following features. For example, the threshold price can equal an effective payout value of the selected primary content item. The query can include a creative associated with the selected primary content item, and delivering one of the selected primary content item and the selected secondary content item can include delivering the creative associated with the selected primary content item to the requester if the threshold price is greater than the effective payout associated with the selected secondary content item. The query can further include a net floor price, and the threshold price can be determined based on the net floor price. The primary datastore can be part of a primary system operated by a publisher of content associated with the request. The secondary datastore can be part of a secondary system operated by an intermediary. The secondary datastore can be part of a secondary system operated by an intermediary. The secondary system can include a content item exchange. The selected primary content item can be selected according to a highest effective payout value among eligible content items of the primary datastore. An effective payout value of the selected primary content item can include a net payment to a seller of a space for which a content item is selected. The selected secondary content item can be selected according to a highest effective payout value among eligible content items of the secondary datastore. An effective payout value of the selected secondary content item can include a net payment to a seller of a space for which a content item is selected. Selecting an eligible primary content item can include determining that no primary content item is eligible, and the threshold price can equal a floor price included in the request. The primary datastore can be part of a primary system operated by a first intermediary, and the secondary datastore can be part of a secondary system operated by a second intermediary. The primary datastore can be part of a primary system, the secondary datastore can be part of a secondary system, and the primary system and the secondary system can include a common hardware component. A common datastore can include the primary datastore and the secondary datastore. The primary datastore can be a component of a primary system, the secondary datastore can be a component of a secondary system, and the primary system and the secondary system may not include a common hardware component. At least one of the selected primary content item and the selected secondary content item can be an advertisement.

In another general aspect, selecting and delivering content items over a data-communications network includes receiving a request for a content item from a requester, selecting from a primary datastore of primary content items, an eligible primary content item having the highest effective payout value for content items in the primary datastore, establishing a query that contains a threshold price and either the selected primary content item or a null reference, selecting from a secondary datastore of secondary content items, an eligible secondary content item having the highest effective payout value for content items in the secondary datastore, if the selected secondary content item has an effective payout value that is higher than the threshold price contained in the query, then delivering the secondary content item to the requestor, else, delivering to the requester, either (i) the primary content item if the query contains a primary content item, or (ii) a default content item or a pass-back if the query contains a null reference.

In another general aspect, a system for selecting and delivering content items over a data-communications network. The system includes a secondary content item server and a secondary datastore accessible by the secondary content item server, where the secondary datastore contains a plurality of secondary content items. The secondary content item server is in communication with a primary content item server in a primary system, where the primary content item server receives a request for a content item from a requestor. The secondary content item server stores instructions adapted to be executed by the secondary content item server to perform the tasks of (i) receiving a query from the primary content item server, where the query contains a threshold price and either a primary content item selected by the primary system or a null reference, (ii) selecting from the secondary database an eligible secondary content item having the highest effective payout value, (iii) if the selected secondary content item has an effective payout value that is higher than the threshold price contained in the query, then delivering the secondary content item to the requestor; and (iv) else, delivering to the requester, either (i) the primary content item if the query contains a primary content item, or (ii) a default content item or a pass-back if the query contains a null reference.

In another general aspect, delivering a content item includes receiving a request for a content item from a requester, selecting an eligible primary content item from a primary datastore, establishing a query that includes selection criteria for use in selection of an eligible secondary content item from a secondary datastore, the selection criteria being established based on the selected primary content item, transmitting the query to a secondary system, and receiving an indication of a selection of one of the selected primary content item and a selected secondary content item selected based on the selection criteria.

The details of one or more implementations are set forth in the accompanying drawings and the description below. Other features will be apparent from the description and drawings, and from the claims.

DETAILED DESCRIPTION

Figure 1:
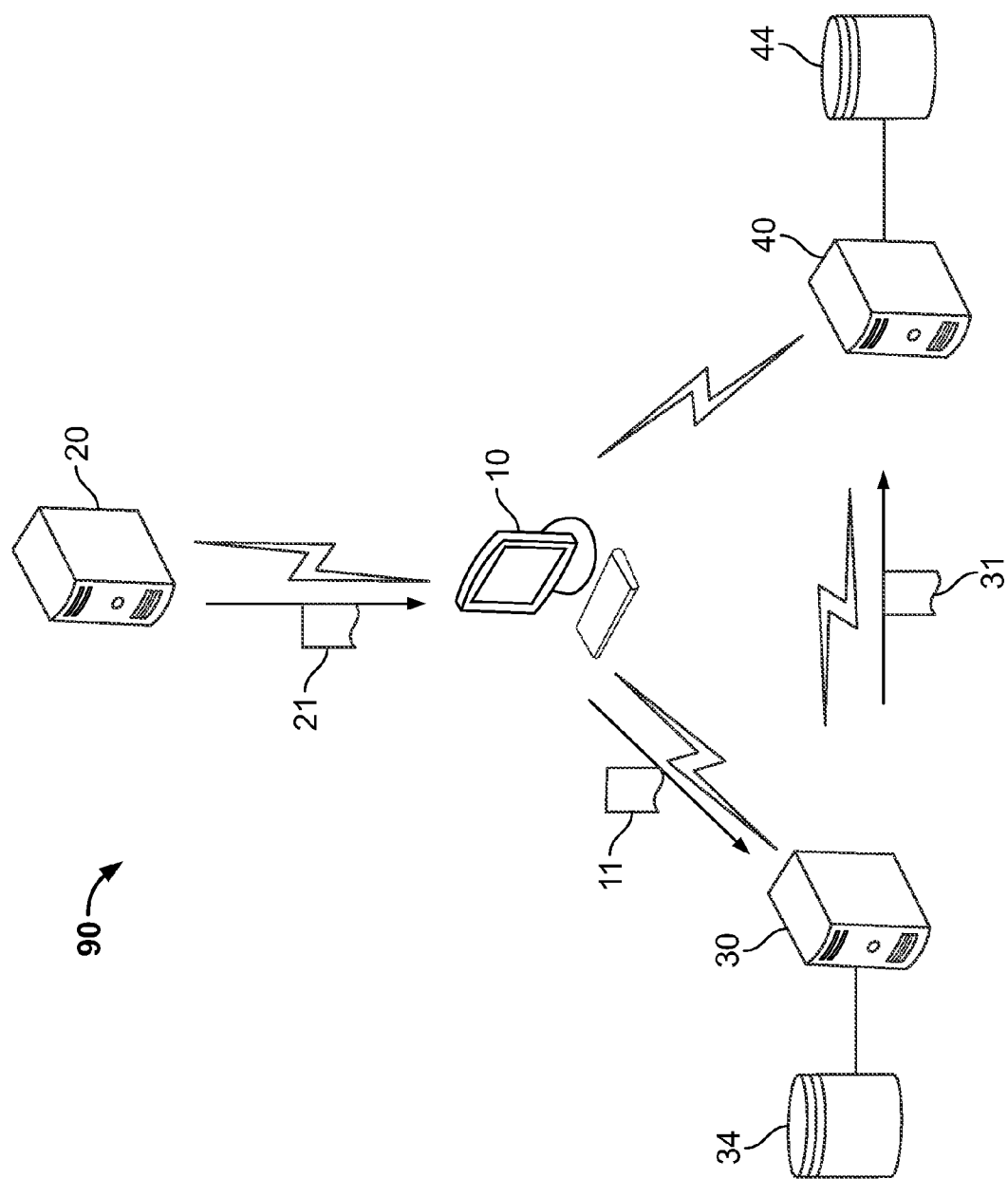
FIG. 1 shows an example system for selecting and delivering content.

In some implementations, a system for selecting and delivering content, such as advertisements, to a consumer over a data-communications network delivers content to fill remnant inventory efficiently. Thus, the system selects as content to fill remnant inventory a content item that is likely to provide the most revenue to a publisher, and the system delivers the content item quickly. For example, the system selects a content item in response to a request quickly enough that an ordinary consumer would not subjectively perceive a delay, or that the ordinary consumer would consider any delay in the delivery to be commensurate with the processing speed of the media system being used by the consumer. In some cases, the delay may be less than 500 milliseconds; and in some cases, less than 200 milliseconds. Any delivery delay of the system may be continuous or persistent, but typically, the delay is non-cumulative within the system.

The content items selected by the system can be suitable for placement in one or more of various types of media, including printed publications, billboards, radio, television, games, network portals, web pages, and other content distribution environments. The sellers and buyers of space, such as advertising space, can be one or more of various business entities that participate in a marketplace, such as an advertising marketplace. The sellers can be end sellers, who publish web pages on which space inventory is sold. The buyers can be end buyers, who are advertisers seeking to buy space for their own content items or advertisements. The sellers and/or buyers can also be intermediaries, who function as representatives of other sellers or buyers. The intermediaries function as both buyers (with respect to the end seller or another intermediary) and sellers (with respect to the end buyer or another intermediary) in sales transactions. For example, when the content items are advertisements, the buyer can be an ad broker, an ad network, or an ad exchange that aggregates advertisers, and/or the seller can be an ad broker, an ad network, or an ad exchange that aggregates publishers selling ad space inventory. As discussed above, the space inventory can be remnant inventory. Additionally, any space can be filled using the system, as described in greater detail below.

The content items may be include one or more media format, including web pages, portions of web pages, banners, text, HTML page address pointers, hypertext, audio content, visual content, buttons, pop-up windows, placement within sponsored search listings, streaming media (including video and/or audio), and combinations thereof. The space inventory includes the capacity to render content items in one or more of these media formats, and an "impression" is delivered each time one of these content items is presented to a user. In some implementations, the system can record an indication of each delivered impression, such as for accounting purposes.

The implementations discussed below are with respect to advertising systems that deliver content items in the form of advertisements, though other types of systems may deliver different kinds of content items, such as audio, video, graphic-based, or text-based content items. In some implementations, an advertising system includes a primary system and a secondary system that are in communication with each other through a network, such as the Internet, a local area network, a wide area network, or a wireless network. Each of the primary and secondary systems includes an associated ad server that runs a computer program application to manage advertisement transactions according to a process of selecting and delivering advertisements. Each of the primary and secondary systems also includes an associated datastore that is accessed by the system's ad servers.

As used herein, a "datastore" refers to an aggregation of data which is kept and maintained in an organized fashion such that data can be retrieved from the datastore. A datastore includes a data repository and special routines, if any, to access the data repository. Non-limiting examples of datastores or datastore components include databases, custom data files, or any part of an ad server system that stores data. The datastores are not necessarily databases.

The primary and secondary systems can also include additional servers, such as, for example, application servers or web servers, computer program applications, and/or databases or other datastores that perform functions such as accounting, data storage, reporting, traffic management, process optimization, and campaign management.

The primary system may be operated by the seller of the ad space inventory, who may be a publisher or an intermediary. The intermediary may represent a content publisher, or may have previously purchased or contracted to purchase the ad space inventory from the publisher, whether or not such purchase or contract was expressly for the purpose of reselling. As such, the primary system can provide a primary marketplace environment for the seller, and for buyers of ad space. The primary system includes an associated datastore of advertisements, and can include the advertisement content, information about the advertisement content, information about a source of the advertisement content, and other information about the advertisement content and/or the advertiser associated with the advertisement content.

Each advertisement in the datastore is associated with payout information representing an amount that the advertiser is willing to pay to have the advertisement delivered as an impression. The payout information can include a total amount that would be paid by the advertiser for each delivered impression, and can include any adjustments to the selling price such as discounts, surcharges, fees, or other adjustments. The payout information may be selected based on one or more criteria conventionally used in advertising transactions, including cost-per-(thousand) impressions (CPM), cost-per-click (CPC), or cost-per-acquisition (CPA).

The datastore can include one or more structures, such as a hierarchal, relational, or flat data structure; and may include any conventional data management system. Additionally, the datastore can include modular or fixed memory devices, magnetic disk storage devices, optical storage devices, or other conventional mass storage devices for storing the data or information relating to the advertisements included in the datastore. A single datastore may be used, or multiple datastores may be used. In some implementations, the datastore may be located remotely from the primary system within the network and may be accessible via a network. Thus, the datastore may include ad creatives, such as GIF, JPEG, or flash computer files, redirect references, such as a redirect tag to an advertiser's ad server, a pointer to the advertisement, a pointer to a pointer, or any other item that can be used to retrieve the particular advertisement, or provide information about the advertisement content or associated advertiser.

The secondary system can be operated by an intermediary to provide an additional marketplace environment for the seller of the ad space inventory, and for buyers of ad space inventory. As such, the secondary system has an associated datastore of advertisements, with each advertisement being associated with a payout representing the final amount that the advertiser is willing to pay to have the advertisement delivered as an impression. The characteristics of the secondary datastore, and of the advertisements stored therein, are similar to those described above for the primary system. There may or may not be overlap between the two marketplace environments. For example, some advertisers may participate in both marketplaces, and some sellers may participate in both marketplaces.

In some implementations, the primary system and the secondary system operate within a single ad server system, such as where the primary system and secondary system share the same ad server hardware, the same physical or network location, and/or the same controlling entity. The datastore of advertisements associated with the primary system may be physically separate from the datastore of advertisements associated with the secondary system. For example, the primary system and the secondary system may share the same ad server hardware, but their respective datastore of advertisements may be physically separate. Alternatively, the two datastores may share the same physical storage device, and may be separated, or separable via software operations. For example, by virtue of different partitioning schemes, the primary system and the secondary system can have ownership of different sets of advertisements stored on the same database.

The primary and/or secondary systems can also include an accounting application that is configured to capture and log transaction information, including information regarding an amount of revenue involved in a transaction, information regarding an indication of an ad delivered as an impression, information regarding a consumer's response to the impression (e.g., click-throughs or conversions), and information specific to the consumer (e.g., demographic, psychographic, and/or behavioral data). This accounting information may be accessible to any of the various users of the system (e.g., subscribing advertisers, publishers, or ad networks) via a web-based application interface. The accounting information does not include personal information about the consumers and, in some implementations, even non-personal information regarding activity of a consumer is only collected when authorized by the consumer, such as by opting in to the collection of transaction information.

In operation, the primary system receives an advertisement request from a requestor. The requester is the system that will present the advertisement to the consumer. For Internet-based advertising, the requester is an Internet browser application running on a consumer's computer system. In this scenario, the consumer visits a publisher's web page. The web page contains a redirect reference (e.g., an HTML <iframe> tag) operable to cause the consumer's computer to transmit a request for an advertisement to the primary system. The request can contain one or more of various types of information, including information about the publisher's web page visited by the consumer, such as information regarding the dimensions of an ad space on the web page, the language of the text displayed on the web page, the nature of the content being displayed on the web page, the minimum hit count of the web page, the geographical focus of the web page content, or other information regarding the publisher's web page or the publisher's web site or business. The request can also include information about the consumer, such as information about the consumer's age, gender, and/or occupation, or information about the consumer's system. The information included in the request can be used to determine whether an advertisement meets associated eligibility criteria, such as ad characteristics required by the publisher.

In response to the request, the primary system searches the associated primary datastore and selects an advertisement. The primary system can select the advertisement having the highest effective payout value from the advertisements that meet the eligibility criteria of the ad request. As used herein, the term "effective payout value" means the price information associated with an advertisement, as optionally adjusted according to any of various performance considerations (e.g., click-through rate, click conversion rate, and number of impressions delivered), risk considerations (e.g., creditworthiness or performance variability), or other business factors (e.g., foreign currency conversion). Thus, the performance considerations are used to adjust a value associated with an advertisement. In some cases, the adjustment of the payout amount includes one or more factors, which can include one or more performance considerations, one or more risk considerations, and a foreign currency conversion. In some cases, the effective payout value is the same as the payout amount for the advertisement, and no adjustments are made. The ad request sent by the requestor can also include a floor price corresponding to the minimum price that the publisher is willing to accept for their delivering an impression in the ad space. The primary system can also determine if an advertisement has an effective payout value that is higher than the floor price. Thus the floor price can function as an eligibility criterion.

After completing the search and selection (or after determining that no ads are eligible), the primary system sends a query to the secondary system. The primary system may communicate with the secondary system either directly or indirectly. For example, the primary system may communicate with the secondary system by instructing the consumer's system to communicate with the secondary system, such as by using a redirect. In cases where the primary system and the secondary system operate within a single ad server system, the primary system may communicate with the secondary system via an internal redirect, in which the advertisement request is diverted from the primary system to the secondary system. As used herein, an "internal redirect" is a redirect that operates in the same manner as a conventional external redirect, except that the destination of the redirect is within the same ad server system. The internal redirect may be specific to the advertisement request or customer.

The query includes information regarding a threshold price, and information regarding either the advertisement selected by the primary system or information indicating that no ad was selected, such as a null reference. The query can include the advertising content itself or information that can be used to retrieve the advertisement selected by the primary system, such as a redirect reference (e.g., a redirect URL to the advertiser's ad server), a pointer to the advertisement content, or a pointer to a pointer. If the primary system is being operated by a publisher, the query includes the advertisement selected by the primary system and the threshold price equals the effective payout value of the selected advertisement. If the primary system is being operated by an intermediary representing a publisher, the content of the query will depend on whether the primary system has found an eligible advertisement having an effective payout value that is higher than the floor price included in the request received by the primary system from, for example, a publisher. If the primary system finds such an advertisement, the query includes the selected advertisement, and the threshold price equals the effective payout value of the selected advertisement. Otherwise, the query may includes a null reference (indicating that no such advertisement was found or none were applicable) and the threshold price equals the floor price of the ad space being offered by the publisher. The query can also include various other information or specifications relating to the advertisement, including its properties and attributes, such as its dimensions, compatible types or formats of content, or other attributes. Elements, targeting criteria, and other relevant data can also be included.

In response to the query from the primary system, the secondary system searches its datastore of advertisements and selects an eligible advertisement having the highest effective payout value. If the effective payout value of the advertisement selected by the secondary system is higher than the threshold price included in the query from the primary system (i.e., the effective payout value of the advertisement selected by the primary system, if one was selected, or the floor price of the ad space being offered by the publisher), then the advertisement selected by the secondary system is delivered to the requestor. The advertisement can be delivered in a form which allows the requestor to retrieve the advertisement. For example, the secondary system may deliver to the requester an HTML tag or an applet tag that identifies the advertiser's ad server. In another example, the secondary system may include a content server that serves the ad creative associated with the selected advertisement directly to the requestor.

If the advertisement selected by the secondary system does not have an effective payout value that is higher than the threshold price included in the query from the primary system, then the message delivered to the requestor will depend on whether the query from the primary system includes an advertisement selected by the primary system, or whether the query includes a null reference indicating that the primary system found no suitable advertisement or none were applicable. If the query includes a selected advertisement, the secondary system delivers the advertisement selected by the primary system to the requester. Otherwise, the secondary system delivers a default advertisement or a pass-back to the requestor. The default advertisement may be any of various responses conventionally used as a back-up in situations such as these, including a house ad (an ad that advertises the publisher), a public service ad, or a null response where no ad will be shown by the requestor. A pass-back indicates that neither the primary system nor the secondary system was able to find a suitable advertisement. As such, the ad request is "passed back" to the requestor. Any of the aforementioned delivery of advertisements or pass-backs by the secondary system to the requester may be performed directly or indirectly (e.g., by the secondary system returning the ad selected by the primary system back to the primary system, which then delivers the selected ad to the requestor).

Additionally, a tertiary system can be included, and the primary system (or the secondary system) can send a query to the tertiary system to determine whether an ad can be selected for delivery in response to the request from the requester. The tertiary system can be queried serially, that is to say after the secondary system has been queried, or in parallel or at the same time as the secondary system is queried. Likewise, additional systems can be included and can be organized as subsidiaries of one or more of the other systems, as siblings of other systems, or in other hierarchical arrangements. Furthermore, the multiple systems, including the primary and the secondary systems can be queried in different combinations and/or orders based on the request. For example, a request associated with a web page of a first publisher may require querying a first group of systems according to a first protocol, and a request associated with a web page of a second publisher may require querying of a different second group of systems, and/or according to a second different protocol.

Furthermore, the threshold price included in the query and/or the floor price can be based on criteria other than those described above. For example, the threshold price included in the query can be based on a net revenue received by a publisher of the ad space associated with a selected primary advertisement, a net revenue received by the publisher associated with a non-selected primary advertisement, such as in a second price auction, or another selected value. Moreover, the threshold price can be a derivative of one of these values or another value, such as a derivative of a net revenue received by the publisher for non-remnant ad space, or a derivative of a price paid by an advertiser for other ad space or the ad space in another system. Additionally, the threshold price and the floor price can be based on different criteria for different requests, and can be different for different advertisements.

Figure 2:
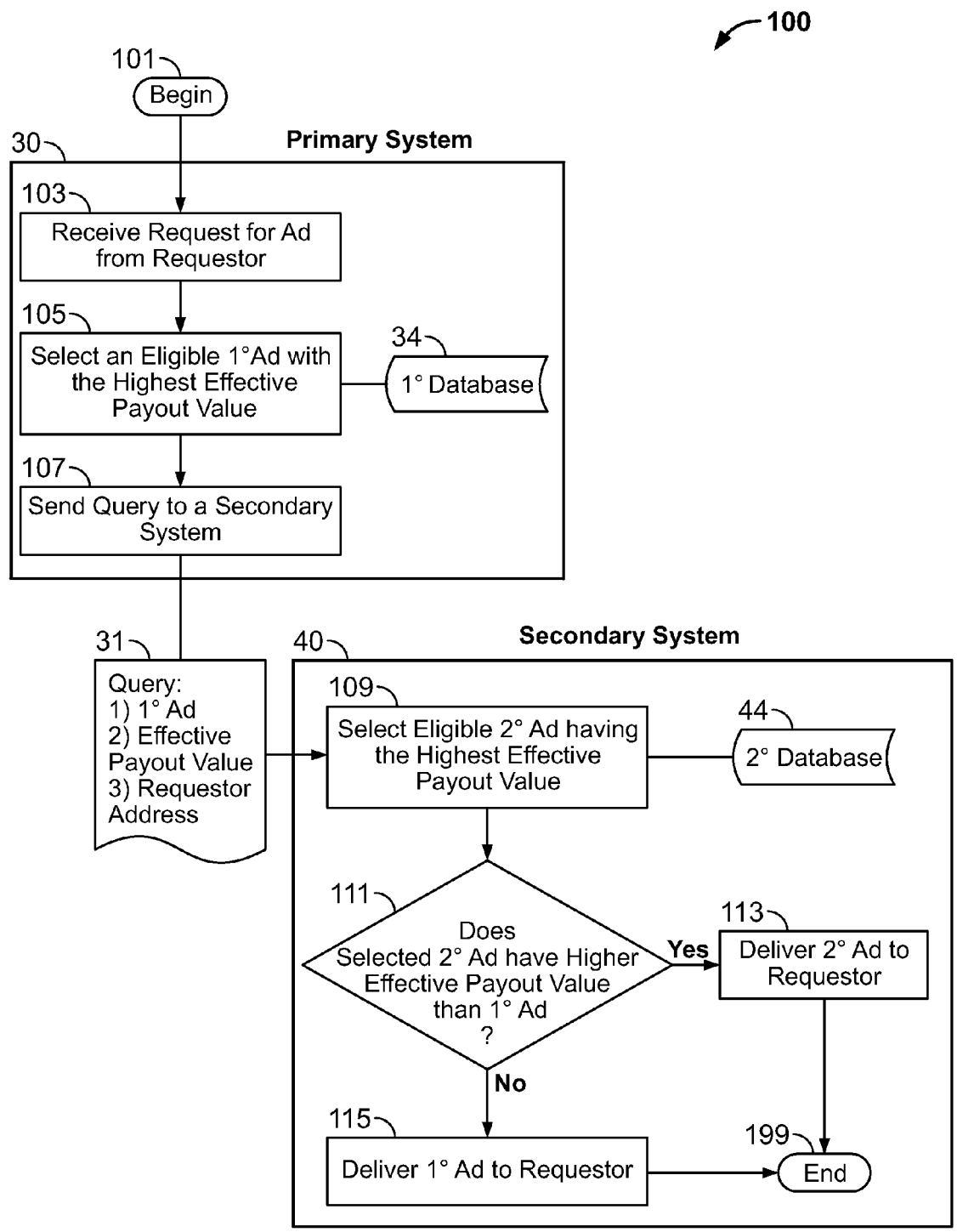
FIG. 2 shows an example process performed by the system of FIG. 1.

For example, FIGS. 1 and 2 illustrate a transaction between a content publisher who offers ad space on a web page and an intermediary representing advertisers who purchase ad space, such as in association with an advertising campaign using a computer system 90. A process 100 begins when a consumer's browser 10 residing on the consumer's personal computer accesses the publisher's web page 21 served by the publisher's content server 20 (101). The web page 21 is transmitted to browser 10 via the Internet in a conventional manner. The web page 21 includes a redirect reference (e.g., an HTML tag or applet tag) that identifies a primary ad server 30 that provides the initial marketplace environment for the content publisher.

Via the redirect reference, the browser 10 sends a request 11 to the primary ad server 30. The request 11 includes information regarding the eligibility criteria for the advertisement selection. The request 11 may also include relevant information about the publisher's web page 21 being visited, the consumer, and/or the consumer's computer system.

When the primary ad server 30 receives the request 11 (103), the primary ad server 30 accesses a primary database 34 of information pertaining to primary advertisements, including information regarding a payout amount from the advertiser of each advertisement. The primary ad server 30 searches the primary database 34 and selects a primary advertisement that is eligible for the request and which has the highest effective payout value among all eligible advertisements included in the primary database 34 (105). The primary ad server 30 then sends a query 31 (either directly or indirectly) to a secondary ad server 40 (107), which may provide, through an ad broker representing multiple advertisers, an additional marketplace environment for the ad space of the web page 21 of the content publisher. The query 31 includes information regarding the selected primary advertisement (which may be a pointer to the advertisement), its effective payout value, and the address of the consumer's browser 10.

When the secondary ad server 40 receives the query 31, the secondary ad server 40 accesses a secondary database 44 of secondary advertisements that includes information regarding a payout amount from the advertiser of each advertisement. The secondary ad server 40 searches the secondary database 44 and selects an eligible secondary advertisement having the highest effective payout value among all eligible advertisements included in the secondary database 44 (109). The secondary ad server 40 then determines whether the effective payout value associated with the selected secondary advertisement is greater than the effective payout value of the selected primary advertisement included in the query 31 (111).

If the effective payout value of the selected secondary advertisement is higher than the effective payout value of the selected primary advertisement included in the query 31, then the secondary ad server 40 delivers to browser 10 the selected secondary advertisement (113) and the process 100 ends (199). The delivery of the selected secondary advertisement can be accomplished by delivering a pointer to the advertisement to the consumer's browser 10.

If the effective payout value of the selected secondary advertisement is not higher than the effective payout value of the selected primary advertisement included in the query 31, then the secondary system 40 delivers the selected primary advertisement included in the query to browser 10 (115), after which the process 100 ends (199). The delivery can be made directly by secondary ad server 40, including by transmitting a pointer, or indirectly by returning the selected primary advertisement to primary ad server 30, which can then deliver the selected primary advertisement to browser 10.

Figure 3:
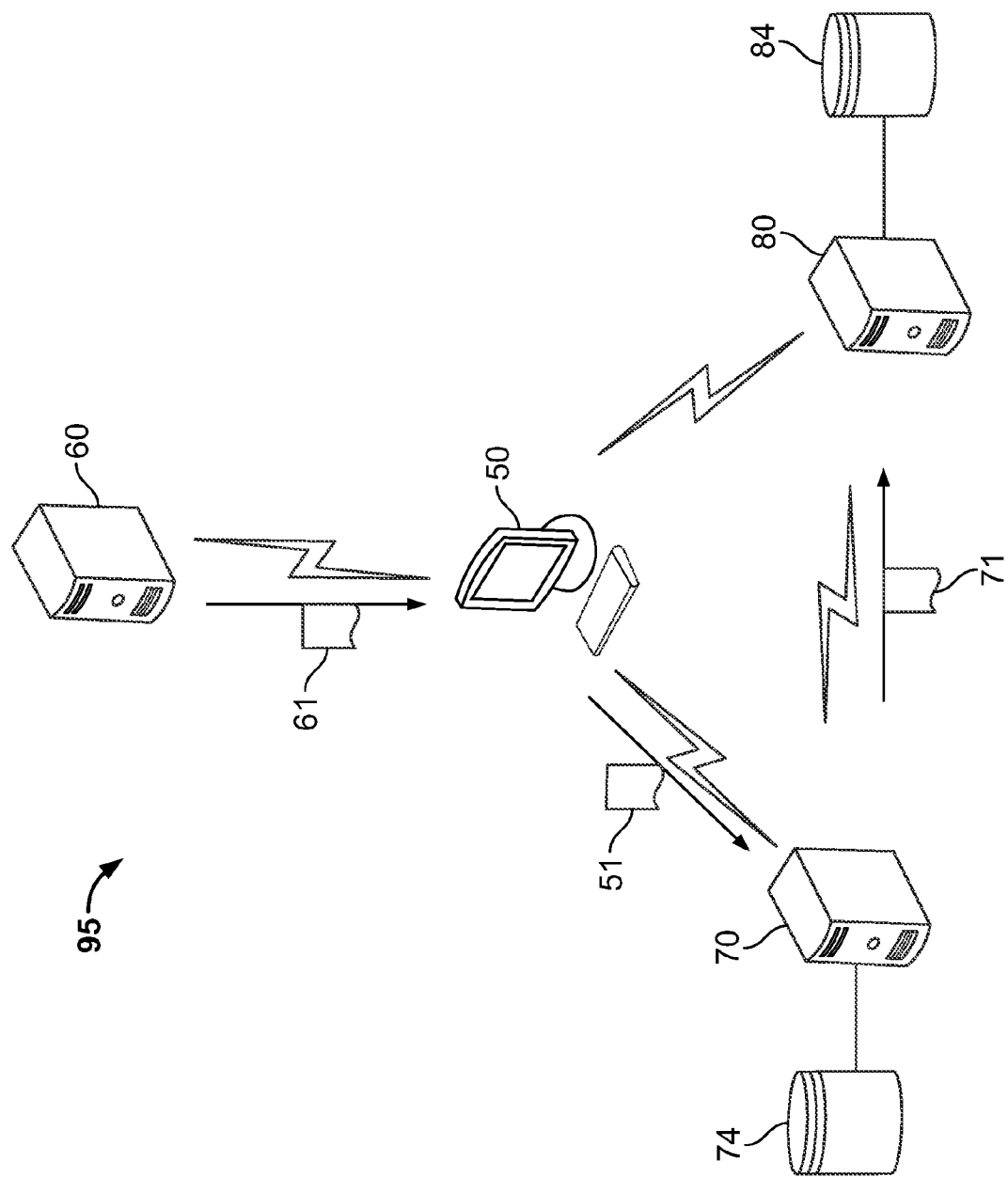
FIG. 3 shows another example system for selecting and delivering content.
Figure 4:
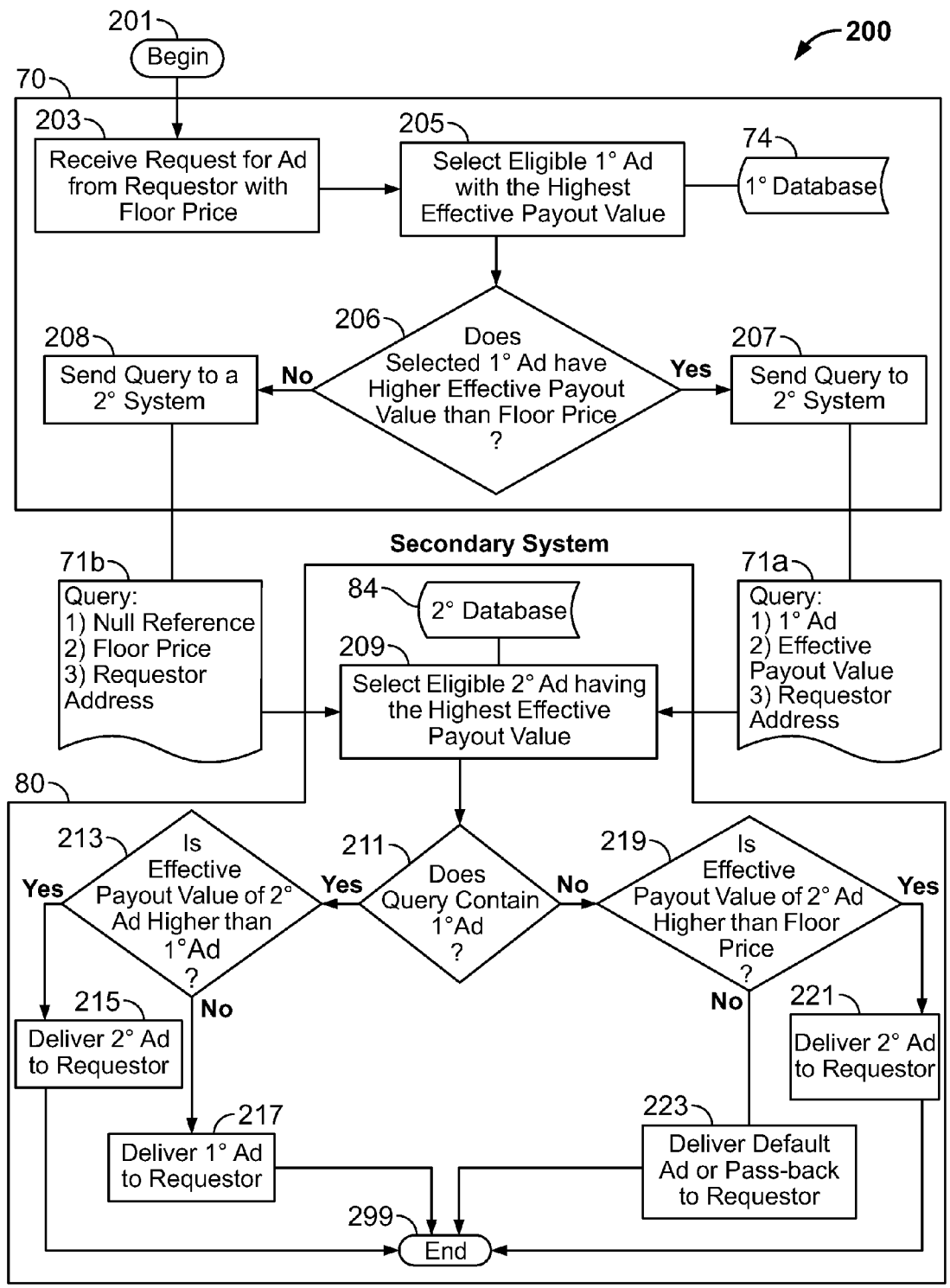
FIG. 4 shows a process performed by the system of FIG. 3.

In another example, as shown in FIGS. 3 and 4, a transaction is conducted between a first intermediary representing one set of advertisers and a second intermediary representing another set of advertisers using a computer system 95. A process 200 begins when a consumer's browser 50 residing on a consumer's personal computer accesses a content publisher's web page 61 served by the publisher's content server 60 (201). The web page 61 is transmitted to browser 50 via the Internet in a conventional manner. The web page 61 includes a redirect reference (e.g., an HTML tag, applet tag, or other appropriate reference or link) that identifies a primary ad server 70 that may provide an initial marketplace environment for an ad broker representing the content publisher. As such, the redirect reference also includes a floor price associated with the ad space of the web page 61.

Via the redirect reference, the browser 50 sends a request 51 to the primary ad server 70, wherein the request 51 includes the floor price and information regarding eligibility criteria for the advertisement selection. The request 51 can also include relevant information about the publisher's web page 61, the consumer, and/or the consumer's computer system.

When the primary ad server 70 receives the request 51 (203), the primary ad server 70 accesses a primary database 74 of information pertaining to primary advertisements, including information regarding a payout amount from the advertiser of each of the primary advertisements. The primary ad server 70 searches the primary database 74 and selects a primary advertisement that is eligible for the request and which has the highest effective payout value among all eligible primary advertisements included in the primary database 74 (205). The primary ad server 70 then determines whether the selected primary advertisement includes an effective payout value greater than or equal to the floor price included in the request 51 (206).

If the selected primary advertisement includes an effective payout value that is greater than or equal to the floor price included in the request 51, the primary ad server 70 sends a first query 71a to a secondary ad server 80 (207). The secondary ad server 80 provides, through a second ad broker representing multiple advertisers, an additional marketplace for the ad space of the publisher's web page 61. The first query 71 includes information regarding the selected primary advertisement (which may be a pointer to the advertisement), its effective payout value, and an address of customer's browser 50.

Otherwise, if the selected primary advertisement includes an effective payout value that is less than the floor price included in the request 51, the primary ad server 70 sends a second query 71b to a secondary ad server 80 (208). The second query 71b includes a null reference (indicating that no suitable primary advertisement was found or none were applicable), along with information regarding the floor price of the ad space of the publisher's web page 61 and the address of customer's browser 50.

When the secondary ad server 80 receives the first request or the second request, the secondary ad server 80 accesses a secondary database 84 of secondary advertisements, including information regarding a payout amount from the advertiser of each of the secondary advertisements. In response to the query 71a or 71b, the secondary ad server 80 searches the secondary database 84 and selects a secondary advertisement that is eligible for the request and which has the highest effective payout value among all eligible secondary advertisements included in the secondary database 84 (209).

The secondary ad server 80 then determines whether the first query 71a was received or whether the second query 71b was received (211). If the first query was received, that is to say if the received query 71 includes information regarding a selected primary advertisement (as opposed to a null reference), then the secondary ad server determines whether the selected secondary advertisement has an effective payout value that is higher than the effective payout value of the selected primary advertisement included in the first query 71a (213).

If the selected secondary advertisement has an effective payout value that is higher than the effective payout value of the selected primary advertisement included in the first query 71a, then secondary ad server 80 delivers the selected secondary advertisement to the customer's browser 50 (215), and the process 200 ends (299). The delivery of the selected secondary advertisement can be accomplished by delivering a pointer to the advertisement to the customer's browser 50.

If the selected secondary advertisement does not have an effective payout value that is higher than the effective payout value of the primary advertisement contained in the first query 71a, then the selected primary advertisement included in the first query 71a is delivered to the customer's browser 50, directly by the secondary ad server 80, including by delivering a pointer to the selected primary advertisement, or indirectly, such as by returning the selected primary advertisement to primary ad server 70, which can then deliver the selected primary advertisement to the customer's browser 50 (217), and the process 200 ends (299).

If the second query 71b was received, that is to say, if the received query 71 includes a null reference, then the secondary ad server 80 determines whether the selected secondary advertisement has an effective payout value that is higher than the floor price contained in the second query 71b (219). If the selected secondary advertisement has an effective payout value that is higher than the floor price contained in the second query 71b, then secondary ad server 80 delivers the selected secondary advertisement to the customer's browser 50 (221), and the process 200 ends (299).

If the selected secondary advertisement does not have an effective payout value that is higher than the floor price contained in the second query 71b, then secondary ad server 80 delivers a default ad or a pass-back to the customer's browser 50 (223), and the process 200 ends (299).

The various systems described herein, and components thereof, may each include a computer-readable storage component for storing machine-readable instructions. The instructions are configured to cause a processor of a computer system to perform the one or more actions describe with regard to the various processes described and illustrated. The storage component may be any type of machine readable medium, such as a hard drive memory device, flash memory device, floppy disk memory device, an optical memory device (including compact disks, DVD-ROMs, DVD±Rs, CD-ROMs, CD±Rs, and holographic disks), a thermomechanical memory device (including scanning-probe-based data-storage devices), or any other type of machine-readable (including computer-readable) storing medium. Each computer system may also include addressable memory, such as random access memory or cache memory, to store data and/or sets of instructions that may be included in, or which may be generated by, the machine-readable instructions when they are executed by a processor on the respective computer system. The processes and systems described herein may also be implemented as machine-readable instructions stored on or embodied in any of the above-described storage devices or media. The various communications, transmissions, deliveries, and other two-party operations described herein may be performed using any encrypted or unencrypted channel, and storage mechanisms described herein may use any storage and/or encryption mechanism.

The foregoing description and examples have been set forth merely for illustration and are not intended to be limiting. Each of the disclosed implementations may be considered individually or in combination with implementations. Other implementations incorporating the spirit and substance of the disclosure may occur to persons skilled in the art and such modifications are intended to be within the scope of the following claims.

What is claimed is:

1. A method of selecting and delivering content items, comprising:
   receiving a request for a content item from a requestor;
   selecting an eligible primary content item from a primary datastore including identifying pricing information associated with delivery of the eligible primary content item;
   after selecting an eligible primary content item, generating, by one or more processors, a query that includes a threshold price and information based at least in part on the received request, wherein the threshold price is based at least in part on one or more of the pricing information or a floor price, wherein the floor price is a minimum price acceptable to a requestor;
   submitting the query to a secondary datastore, the secondary data store being different than the primary datastore;
   receiving a selection of an eligible secondary content item from the secondary datastore;

comparing an effective payout associated with the eligible secondary content item to the threshold price; and delivering one of the primary content item or the secondary content item to the requestor based on the comparison of the effective payout associated with the secondary content item to the threshold price.

2. The method of claim 1, wherein the threshold price equals an effective payout value of the primary content item.

3. The method of claim 1, wherein the query includes a creative associated with the primary content item, and wherein delivering one of the primary content item or the secondary content item comprises delivering the creative associated with the primary content item to the requester if the threshold price is greater than the effective payout associated with the secondary content item.

4. The method of claim 3, wherein the query further includes a net floor price, and wherein the threshold price is determined based on the net floor price.

5. The method of claim 1, wherein the primary datastore is part of a primary system operated by a publisher of content associated with the request.

6. The method of claim 5, wherein the secondary datastore is part of a secondary system operated by an intermediary.

7. The method of claim 1, wherein the secondary datastore is part of a secondary system operated by an intermediary.

8. The method of claim 7, wherein the secondary system comprises a content item exchange.

9. The method of claim 1, wherein the primary content item is selected according to a highest effective payout value among eligible content items of the primary datastore.

10. The method of claim 9, wherein an effective payout value of the primary content item comprises a net payment to a seller of a space for which the primary content item is selected.

11. The method of claim 9, wherein the secondary content item is selected according to a highest effective payout value among eligible content items of the secondary datastore.

12. The method of claim 1, wherein at least one of the primary content item and the secondary content item is an advertisement.

13. The method of claim 11, wherein an effective payout value of the secondary content item comprises a net payment to a seller of a space for which a content item is selected.

14. The method of claim 1, further comprising selecting an eligible primary content item including determining that no primary content item is eligible, and wherein the threshold price equals a floor price included in the request.

15. The method of claim 1, where the primary datastore is part of a primary system operated by a first intermediary, and wherein the secondary datastore is part of a secondary system operated by a different second intermediary.

16. The method of claim 1, wherein the primary datastore is part of a primary system, the secondary datastore is part of a secondary system, and wherein the primary system and the secondary system include a common hardware component.

17. The method of claim 1, wherein a common datastore includes the primary datastore and the secondary datastore.

18. The method of claim 1, wherein the primary datastore is a component of a primary system, wherein the secondary datastore is a component of a secondary system, and wherein the primary system and the secondary system do not include a common hardware component.

19. A system for selecting and delivering content items, comprising:
a primary content item server;
a primary datastore accessible by the primary content item server, wherein the primary datastore includes information regarding a plurality of primary content items;
a secondary content item server; and
a secondary datastore accessible by the secondary content item server and being different from the primary datastore, wherein the secondary datastore includes information regarding a plurality of secondary content items;
wherein the primary content item server stores instructions that are operable, when executed by the primary content item server, to:
receive a request for a content item from a requestor;
select an eligible primary content item from the primary database the eligible primary content item having associated pricing information associated with delivery of the eligible primary content item; and
after selecting an eligible primary content item, generate a query that contains a threshold price and information based at least in part on the received request wherein the threshold price is based at least in part on one or more of the pricing information or a floor price, wherein the floor price is a minimum price acceptable to a requestor;
submit the query to the secondary content item server; and
wherein the secondary content item server stores instructions that are operable, when executed by the secondary content item server, to:
select an eligible secondary content item from the secondary database based at least in part on the query;
compare an effective payout associated with the selected secondary content item to the threshold price; and
enable delivery of one of the selected primary content item or the selected secondary content item to the requestor based on the comparison of the effective payout associated with the selected secondary content item to the threshold price.

20. The system of claim 19, wherein the threshold price equals an effective payout value of the selected primary content item.

21. The system of claim 19, wherein the query includes a creative associated with the selected primary content item, and wherein the delivering one of the selected primary content item and the selected secondary content item comprises delivering the creative associated with the selected primary content item to the requester if the threshold price is greater than the effective payout associated with the selected secondary content item.

22. The system of claim 21, wherein the query further includes a net floor price, and wherein the threshold price is determined based on the net floor price.

23. The system of claim 19, wherein the primary datastore is part of a primary system operated by a publisher of content associated with the request.

24. The system of claim 23, wherein the secondary datastore is part of a secondary system operated by an intermediary.

25. The system of claim 19, wherein the secondary datastore is part of a secondary system operated by an intermediary.

26. The system of claim 25, wherein the secondary system comprises a content item exchange.

27. The system of claim 19, wherein the selected primary content item is selected according to a highest effective payout value among eligible content items of the primary datastore.

28. The system of claim 27, wherein an effective payout value of the selected primary content item comprises a net payment to a seller of a space for which a content item is selected.

29. The system of claim 27, wherein the selected secondary content item is selected according to a highest effective payout value among eligible content items of the secondary datastore.

30. The system of claim 29, wherein an effective payout value of the selected secondary content item comprises a net payment to a seller of a space for which a content item is selected.

31. The system of claim 19, wherein selecting an eligible primary content item comprises determining that no primary content item is eligible, and wherein the threshold price equals a floor price included in the request.

32. The system of claim 19, where the primary datastore is part of a primary system operated by a first intermediary, and wherein the secondary datastore is part of a secondary system operated by a second intermediary.

33. The system of claim 19, wherein the primary datastore is part of a primary system, the secondary datastore is part of a secondary system, and wherein the primary system and the secondary system include a common hardware component.

34. The system of claim 19, wherein a common datastore includes the primary datastore and the secondary datastore.

35. The system of claim 19, wherein the primary datastore is a component of a primary system, wherein the secondary datastore is a component of a secondary system, and wherein the primary system and the secondary system do not include a common hardware component.

36. The system of claim 19, wherein at least one of the selected primary content item and the selected secondary content item is an advertisement.

37. A computer program product tangible embodied in a computer storage medium that includes instructions, that when executed by a processor, cause the processor to:
    receive a request for a content item from a requestor;
    select an eligible primary content item from the primary database the eligible primary content item having associated pricing information associated with delivery of the eligible primary content item; and
    after selecting an eligible primary content item, generate a query that contains a threshold price and information based at least in part on the received request wherein the threshold price is based at least in part on one or more of the pricing information or a floor price, wherein the floor price is a minimum price acceptable to a requestor;
    submit the query to the secondary content item server; and
    wherein the secondary content item server stores instructions that are operable, when executed by the secondary content item server, to:
    select an eligible secondary content item from the secondary database based at least in part on the query;
    compare an effective payout associated with the selected secondary content item to the threshold price; and
    enable delivery of one of the selected primary content item or the selected secondary content item to the requestor based on the comparison of the effective payout associated with the selected secondary content item to the threshold price.

\* \* \* \* \*